United States Patent [19]

Nolan

[11] 3,879,369

[45] Apr. 22, 1975

[54] ANTI-COAGULANT ISOLATION FROM MALAYAN PIT VIPER USING AFFINITY CHROMATOGRAPHY

[75] Inventor: Chris Nolan, Gurnee, Ill.

[73] Assignee: Abbott Laboratories, North Chicago, Ill.

[22] Filed: May 12, 1972

[21] Appl. No.: 254,337

[52] U.S. Cl. ............................. 260/112 R; 424/98
[51] Int. Cl. ............................................ A61r 17/00
[58] Field of Search .................... 260/112 R; 424/98

[56] References Cited
UNITED STATES PATENTS

| | | | |
|---|---|---|---|
| 3,657,416 | 4/1972 | Reid et al. | 424/94 |
| 3,711,376 | 1/1973 | Hatton | 195/62 |
| 3,743,722 | 7/1973 | Nolan | 424/98 |

*Primary Examiner*—Howard E. Schain
*Attorney, Agent, or Firm*—Paul D. Burgauer; Robert L. Niblack

[57] ABSTRACT

A process for the purification and isolation of the thrombin-like fraction of the venom of the Malayan pit viper is described. The simple process uses affinity chromatography for the fractionation of native venom, employing specifically buffered loading and elution solutions. The chromatographic column uses an agmatine-coupled agarose packing.

5 Claims, No Drawings

ANTI-COAGULANT ISOLATION FROM MALAYAN PIT VIPER USING AFFINITY CHROMATOGRAPHY

DETAILED DESCRIPTION OF THE INVENTION

For some years, it has been known that the venom of certain pit vipers, e.g., *Agkistrodon rhodostoma*, contains a component which is useful as an anti-coagulant. More recently, it was discovered that this component actually is a coagulant for blood. In its action, the thrombin-like material to which this invention is directed forms non-cross-linked fibrin polymer which is removed readily by the body's reticulo-endothelial and/or its fibrinolytic system, thus lowering or depleting the fibrinogen of the blood. It therefore produces an anti-coagulant effect.

Unfortunately, the methods for isolating this component known to date leave much to be desired. One of these methods involves a two-stage chromatographic procedure, requiring two columns with different packings and two differently buffered solutions with different requirements for extraction solvents in the two stages. The substrate most commonly used for the first stage of this chromatographic method is triethylaminoethyl cellulose which unfortunately does not produce reliable or easily reproducible results. Worst of all, the so purified venom solution sometimes still contains hemorrhagic factor which is the most dangerous component of the viper's venom. In another method described more recently, affinity chromatography has been used but yield and quality of the isolated thrombin-like material are not optimal.

It is therefore an object of the present invention to provide a simplified process for the production of pure thrombin-like material from the venom of the Malayan pit viper; it is a further object to provide a reproducible process for the isolation of the thrombin-like fraction of the Malayan pit viper venom; it is another object of this invention to provide an isolation method for the thrombin-like activity from the Malayan pit viper venom with a high specific activity and in excellent yield. It is a particular object of this invention to provide an improvement of the method for isolating the thrombin-like activity from snake venoms which uses affinity chromatography.

These and other objects are accomplished by buffering a clear, dilute, aqueous solution of the native venom of *Agkistrodon rhodostoma* which contains a thrombin-like acting component, to a pH of 7.5–8.3, placing said solution on a column packed with agmatine-coupled agarose beads, washing the column at ambient temperature with a 0.25 molar aqueous salt solution of pH 7.5–8.3 and subsequently eluting the thrombin-like acting material from the column.

The above reference to agmatine-coupled agarose is intended to describe agarose beads to which 4-aminobutylguanidine (agmatine) is covalently bound. Agmatine has been found to be a competitive inhibitor of thrombin-like acting material of the pit viper venom; it prevents the active material from being eluted from the column until almost all other protein materials are eluted. The coupling of agmatine to the agarose is done in known fashion, using activated agarose beads with a bead size preferably ranging between 40 and 190 × $10^{-4}$ cm. in diameter in their wet stage. An agmatine-coupled agarose containing 60–120 micromoles of agmatine per gram of dry weight is suitable for the above process. The preferred range is between 100 and 120 micromoles of agmatine per gram or about 1.2–1.5% by weight, as determined by analysis after 20 hours of hydrolysis in 5.7 N hydrochloric acid at 110°C.

In order to produce good reproducibility with the present process and a pure thrombin-like acting material, the bed volume of agmatine-agarose should be at least 20 to 25 ml./g. of venom. Of course, larger bed volumes may be used but no additional benefits are derived from such increased volume. An elution rate of 15 to 30 ml./hr./cm$^2$ of cross-sectional area is optimal.

The term "native" used in describing the venom in the present description is meant to define a venom which has not been previously treated by other chromatographic or chemical procedures. Consequently, it contains other protein materials previously designated as fractions I–VIII including the hemorrhagic factor and fractions V and VII, i.e., those having physicochemical characteristics similar to those of the coagulant factor with which the present isolation procedure is concerned. These undesirable fractions and components are completely eliminated from the native venom through the present process and no previous ion exchange treatment is needed. On the other hand, it will be understood that the term "native" as defined above does not imply that the venom must be virtually untouched prior to the present one-step separation; it may be centrifuged to eliminate sediments, lyophilized to improve stability and, of course, must be dissolved to satisfy the requirements of being applicable as a clear, dilute aqueous solution. If desired, the venom solution may be pre-treated with ammonium sulfate to remove certain undesired proteins therefrom. However, such treatment is not necessary as seen below.

The aqueous 0.25 molar sodium chloride solution of the native venom may contain between 0.5 and about 3% by weight of the venom in the properly buffered pH range. The preferred buffer for this solution is a non-toxic salt of tris(hydroxymethyl)aminomethane, although other buffers may be used in its place. The preference for a non-toxic buffer is based on the fact that according to this procedure tris(hydroxymethyl)aminomethane is later used as buffer for the solution which elutes the isolated protein fraction containing the thrombin-like activity.

This eluate is in a highly purified form. However, it will require transfer into a medicinally suitable form which is ordinarily accomplished by filtration in the desired buffer. Also, this final solution may require dilution. A convenient injectable solution ordinarily contains between 50 and 200 units (as defined by Owren in Acta Medica Scandinavia, Suppl. 194 of 1947) of the thrombin-like activity per ml. while the present eluate contains 1400–1900 units/ml.

In a general embodiment of this invention, the native venom is dissolved in a sodium chloride solution of a molarity of 0.25 buffered to a pH of 7.5–8.3 and placed on the agarose beads which are pre-treated with agmatine. The column is then washed with an aqueous sodium chloride solution of 0.25 molarity, buffered to a pH of 7.5–8.3 with tris(hydroxymethyl)aminomethane hydrochloride or another non-toxic, pharmaceutically acceptable buffer. The eluate is collected in fractions and the fractions are monitored for absorption at 280 nm. A large peak of 280 nm-absorbing material is eluted with this buffer and elution is continued until the absorbance decreases to ≤ 0.04. At that time, the wash liquor is replaced by the eluant which is preferably buffered in the same fashion as the wash liquor but contains 0.1 to 0.25 molar guanidine hydrochloride rather than sodium chloride. In a preferred embodiment, the fractions are collected at ambient temperatures at a flow rate of 15–30 ml./hr./cm$^2$ of column cross-sectional area. Best results are obtained when the guanidine hydrochloride concentration is approximately 0.15 moles and the column is maintained at a temperature between 20° and 25°C.

The agmatine-coupled agarose beads are prepared in known fashion from a commercial agarose in bead form. The beads are then placed in a column where they act as affinity chromatogram packing; they are extremely efficient in retaining the active venom protein while retaining the other proteins with much less affinity or not at all. During washing with the above described buffered sodium chloride solution, these other components are easily washed from the column and the thrombin-like component remaining on the column is eluted almost quantitatively with the buffered guanidine hydrochloride solution. This results in an extremely pure, isolated thrombin-like acting material. If desired, this material may be used medicinally after gel filtration and adjustment of its concentration to the chosen level. Suitable diluents are water, saline or a dilute tris(hydroxymethyl)aminomethane hydrochloride solution. The latter material may be added also when the obtained pooled eluate is of a pH unsuitable for intravenous injections; the preferred pH range for this purpose is close to 7.

The new method differs from previously suggested isolation procedures in the following novel aspects: (1) the active component is eluted with guanidine hydrochloride of a specific concentration range and buffered to a desirable, narrow pH range; (2) the eluant contains the active material with a specific activity far greater than heretofore believed possible in a simple, one-step process; (3) the active material is obtained in a yield of about 90% or more as calculated from the content thereof in native venom, and (4) the agmatine agarose bed used in this new isolation technique can be re-used for subsequent batches of venom, requiring only a simple and fast regeneration technique. This regeneration consists in washing the beads, if desired in the column, with 4–10 volumes of 0.5 N acetic acid and reequilibrating the column with the above described 0.25 molar buffered sodium chloride solution.

In order to illustrate the present method, reference is made to the following example which, however, is not intended to limit the invention in any respect.

EXAMPLE

Agmatine was coupled to Sepharose 4B (a beaded agarose material of a wet bead size of 40–190 μ and having an agarose content of about 4% which excludes proteins of molecular weights above 20 × 10$^6$; (marketed by Pharmacia, Ltd. of Sweden) by the procedure of Cuatrecasas et al. described in Proc. Natl. Acad. Sci., U.S. 61, 636 (1968) except that the pH was maintained at 11.0 for 30 minutes during CNBr-activation of the agarose and the coupling reaction was performed in 0.1 N NaHCO$_3$—NaOH buffer at pH 10.0 using 22.9 mg. of agmatine sulfate per ml. of settled volume of agarose. The agmatine content of the agmatine-agarose prepared in this fashion was 115 micromoles/g. dry weight.

A solution of 1.0 g. of lyophilized native venom of the Malayan pit viper in 50 ml. of 0.25 molar aqueous sodium chloride buffered with 0.01 molar tris(hydroxymethyl)aminomethane hydrochloride to a pH 8.1 and containing 0.1% by weight of chlorobutanol as preservative was placed on a chromatographic column of 1.9 cm. diameter packed with the above agmatine-agarose beads to a height of 14 cm. The column was then washed at room temperature at a flow rate of 70–90 ml./hour with a 0.25 molar aqueous sodium chloride solution containing 0.1% chlorobutanol and buffered to a pH of 8.1 with tris(hydroxymethyl)aminomethane hydrochloride. The eluate was collected automatically in fractions of 10–11 ml. and the $A_{280nm}$ of the effluent was monitored. Washing was continued until a large "break-through" peak of 280 nm-absorbing material was eluted and the $A_{280nm}$ of the column effluent decreased to 0.04. This requires approximately 300 ml. of this wash solution. The collected fractions were virtually devoid of the desired thrombin-like material and were discarded.

The wash liquor was then replaced by the eluant designed to elute the thrombin-like component; an aqueous 0.15 molar guanidine hydrochloride solution buffered with 0.01 M tris(hydroxymethyl)aminomethane hydrochloride to pH 8.1 and containing 0.1% chlorobutanol. The thrombin-like component eluted as a rather sharp peak with the peak concentration at one column void volume after elution started. The column is eluted with a total of 200 ml. of this buffered guanidine solution and the thrombin-like material is recovered in approximately 90% yield in a volume of 100 to 120 ml.

The eluate containing the thrombin-like material was then concentrated 10-fold by ultrafiltration and the concentrate obtained placed on a chromatographic column packed with Sephadex G–100 in bead form (marketed by Pharmacia of Uppsala, Sweden) which had been equilibrated with 0.1 molar sodium chloride in 0.1 molar sodium phosphate of pH 6.8 containing 0.1% chlorobutanol. The packing had a height of 95 cm and a diameter of 2.5 cm. This column eliminates the guanidine hydrochloride and the buffer contained in the above concentrate.

The isolated thrombin-like material obtained in this fashion was compared with a previously identified highly purified sample of the isolated thrombin-like material from pit viper venom: the two samples were found to be identical in the polyacrylamide gel electrophoresis method using 7.0% gels at pH 8.9 (described by Ornstein in Annals of N.Y. Acad. of Science, 121, 321 1964) showing identical electrophoretic mobilities; by gel filtration on Sephadex G–100 (a dextran gel, partially cross-linked and containing random ether linkages which separates substances with molecular weights smaller than 10$^5$), indicating the same molecular weight, same specificity but greater potency (specific activity). The hemorrhagic factor was totally absent from both and both materials cause purified plasma fibrinogen to clot.

The specific activity of thrombin-like material obtained by this new procedure ranges in anti-coagulant potency between 1800 and 2000 units/ml/$A_{280nm}$ and was found to be homogeneous by the identifying criteria including gel filtration and ultracentrifugal properties, SDS disc gel electrophoresis and imminodiffusion.

In a larger scale repetition of the above procedure, a 20 g. venom sample was placed on a correspondingly larger column bed (6.5 × 14 cm) with the venom sample dissolved in 1000 ml. of the above sodium chloride solution. The column was washed as shown above with 4–6 liters of the above wash liquor and then with 2–2.5 liters of the above described buffered guanidine hydrochloride solution. The thrombin-like material eluted in the latter buffer in a volume of 1.4–1.8 liters. After stripping the desired material from the column in this fashion, the agarose bed was regenerated as shown above and the column was used for a new batch of venom. In this fashion, the desired material is collected in the high purity and yield described above in each of four batches used over the same column of agmatine agarose. The gel filtration in this instance was done with a column of 9.5 cm. diameter and a height of 115 cm. packed with Sephadex G–100, using the buffer as shown above.

When the Sepharose used in the above process was replaced by Bio-Gel A–15 m of wet mesh size 50–100 (an agarose marketed by Bio-Rad Laboratories, Richmond, Cal., the designation A indicates that the resin is agarose and 15m indicates that molecules of a molecular weight above $15 \times 10^6$ will be excluded from the gel), the resulting pooled fractions showed the same potency and degree of purification as above.

It will be recognized that the present method greatly simplifies the procedure to isolate the active coagulant component from snake venom. In particular, it will be noted that only a single affinity chromatogram is required to obtain a material of highest purity which previously was available only by more complicated two-stage methods or which resulted in less potent material or which were associated with considerable loss of valuable activity. The new process yields material of highest potency, showing the same molecular size, anticoagulant activity and matching in other physical and chemical identification respects with more elaborately refined material obtained by older methods. It is particularly noteworthy and surprising that a simple affinity chromatogram is the only requirement to isolate a purified, high potency, thrombin-like material from previously untreated snake venom, yielding this valuable fraction in nearly theorectical amounts.

In view of the surprising efficiency of the present purification and isolation procedure, it will be seen that the buffer and salt concentration of the venom solution should be prepared with pyrogen-free materials, and if desired, a preservative may be added to the venom solution initially or such a component may be added subsequently to the purified, isolated coagulant fraction if that solution is intended for storage or extended shelf-life. Numerous preservatives are suitable for this purpose, e.g., benzylalcohol, methyl and/or propyl p-hydroxybenzoate, chlorobutanol and the like. Usually, 0.05 to 1.0% of such a preservative is sufficient to satisfy all normal storage requirements.

The buffered solution obtained from the affinity chromatography step is preferably concentrated by ultrafiltration and passed through a gel filtration column in a physiologically acceptable buffer which then remains with the desired purified, isolated material. This material is now pure enough to be administered to warm-blooded animals to prevent blood clotting or to dissolve already formed blood clots. A molecular sieve such as Sephadex G–100 provides an excellent gel filtration material with the proper amount of cross-linking. Other cross-linked dextran gels can be used in place of Sephadex G–100, e.g., Sephadex G–25, G–75, G–200, cross-linked polyacrylamides such as Bio-Gel 10 and Bio-Gel 300 and others. Other methods for removing the guanidine hydrochloride and the buffer of the elution step consists in a simple dialysis against the desired buffer and solvent system.

I claim:

1. The process of isolating the thrombin-like acting component from the venom of the viper *Agkistrodon rhodostoma* consisting essentially in preparing a clear solution of the native venom in a 0.25 molar aqueous sodium chloride solution buffered to a pH of 7.5–8.3, placing said solution on a columnar bed packed with agmatine-coupled agarose beads, washing the column with a 0.25 molar aqueous solution of sodium chloride buffered to a pH of 7.5–8.3 until the amount of material absorbing at 280 nm is reduced to 0.04 or less, and eluting the active thrombin-like material from said column with an aqueous solution of 0.1–0.25 molar guanidine hydrochloride buffered to a pH of 7.5–8.3.

2. The process according to claim 1 wherein said guanidine hydrochloride solution is about 0.15 molar.

3. The process according to claim 1 wherein said guanidine hydrochloride solution is buffered with 0.01 molar tris(hydroxymethyl)aminomethane hydrochloride to a pH of 8.1 ± 0.1.

4. The process of claim 1 wherein said agarose beads contain 60–120 micromoles of agmatine per gram of dry weight.

5. The process of claim 1 wherein said clear venom solution contains between 0.5 and 3% by weight of venom.

* * * * *